United States Patent [19]

Nalepa et al.

[11] Patent Number: 4,975,515

[45] Date of Patent: Dec. 4, 1990

[54] POLYURETHANES

[75] Inventors: Christopher J. Nalepa, Baton Rouge, La.; James H. Simon, Coralville, Iowa

[73] Assignee: Ethyl Corporation, Richmond, Va.

[21] Appl. No.: 313,720

[22] Filed: Feb. 21, 1989

Related U.S. Application Data

[63] Continuation-in-part of Ser. No. 111,814, Oct. 21, 1987, abandoned.

[51] Int. Cl.$^5$ .......................... C08G 18/32; B29B 7/00
[52] U.S. Cl. ..................... 528/64; 264/328.1; 528/68
[58] Field of Search .......................... 528/64

[56] References Cited

U.S. PATENT DOCUMENTS

| | | | |
|---|---|---|---|
| 3,701,374 | 10/1972 | McGillvary | 528/64 |
| 4,146,688 | 3/1979 | Schwindt et al. | 528/64 |
| 4,212,916 | 7/1980 | Tanaka et al. | 528/64 |
| 4,526,905 | 7/1985 | Lucast et al. | 528/64 |
| 4,549,007 | 10/1985 | Lin et al. | 528/64 |
| 4,595,742 | 6/1986 | Nalepa et al. | 528/64 |
| 4,722,989 | 2/1988 | Starna et al. | 528/64 |

*Primary Examiner*—Morton Foelak
*Attorney, Agent, or Firm*—Patricia J. Hogan; Richard J. Hammond

[57] ABSTRACT

Novel polyurethanes having superior high temperature performance are prepared by reacting 3,5-di(methylthio)2,6-diaminotoluene with a toluenediisocyanate prepolymer having a free —NCO content of 0.1–20% by weight, preferably a toluenediisocyanate/polyether glycol prepolymer having a free —NCO content of 2–7% by weight. The elastomers have good dynamic properties, such as resilience, that make them attractive as tire-forming materials.

19 Claims, No Drawings

POLYURETHANES

CROSS-REFERENCE TO RELATED APPLICATION

This application is a continuation-in-part of copending application Ser. No. 111,814, filed Oct. 21, 1987, now abandoned.

FIELD OF THE INVENTION

This invention relates to polyurethanes and more particularly to polyurethanes having excellent high temperature performance.

BACKGROUND

It is known that polyurethanes having good-to-poor properties can be prepared by reacting isocyanate prepolymers with chain extenders and that the properties obtained are at least partly dependent on the particular prepolymer/chain extender combination used to prepare the polyurethane. A disadvantage of known polyurethanes is that even those which have otherwise satisfactory properties do not retain sufficient hardness at elevated temperatures to make them useful in applications where they would be subjected to temperatures in excess of about 175° C.

U.S. Pat. No. 4,595,742 (Nalepa et al.) discloses the utility of aromatic diamines bearing two ar-alkylthio substituents as chain extenders which can be reacted with a variety of isocyanate prepolymers.

SUMMARY OF INVENTION

An object of this invention is to provide novel polyurethanes.

Another object is to provide such polyurethanes having superior high temperature performance.

Still another object is to provide such polyurethanes having dynamic properties which make them useful in forming tires.

A further object is to provide processes for preparing the polyurethanes.

These and other objects are attained by reacting 3,5-di-(methylthio)-2,6-diaminotoluene with a toluenediisocyanate prepolymer having a free —NCO content of 0.1-20% by weight.

DETAILED DESCRIPTION

Toluenediisocyanate prepolymers utilizable in the practice of the invention are known materials which are prepared by reacting toluene-2,4-diisocyanate and/or toluene-2,6-diisocyanate with an organic compound containing active hydrogen, e.g., a polyester polyol, a polyether polyol, an amine-terminated polyether, etc., such as the active hydrogen-containing compounds taught in Nalepa et al., the teachings of which are incorporated herein in toto by reference. In a preferred embodiment of the invention, the active hydrogen-containing compound is a polyether polyol, especially a polytetramethylene ether glycol. It is also preferred that the prepolymer have a free —NCO content of 0.5-15% by weight, most preferably 2-7% by weight.

The 3,5-di(methylthio)-2,6-diaminotoluene which is reacted with the prepolymer as a chain extender is a pure or substantially pure compound containing not more than about 5% by weight of impurities, such as the mono(methylthio)-2,6-diaminotoluenes that are typically formed as by-products in the synthesis of 3,5-di(-methylthio)-2,6-diaminotoluene. The amount of chain extender employed is generally 0.8-1.2 equivalents, preferably 0.95-1.05 equivalents, per equivalent of the prepolymer.

As in the preparation of other cast polyurethane elastomers, the polyurethanes of the present invention are prepared by casting a mixture of the prepolymer, the chain extender, and any optional ingredients into a suitable mold, e.g., a tire mold, curing the reaction mixture in the mold to form a polyurethane, and removing the polyurethane from the mold. Curing temperatures of about 25-150° C. are particularly suitable. Optional ingredients that may be employed include conventional additives, such as blowing agents, flame retardants, emulsifiers, pigments, dyes, mold release agents, foam stabilizers, fillers, etc. In a preferred embodiment of the invention, the reaction mixture is degassed prior to casting.

The polyurethanes of the invention have good physical properties, such as higher modulus at 100 and 300% elongation, improved tear strength, and increased Shore A hardness, which make them useful in a variety of applications; but their resilience makes them particularly attractive as elastomers for making tires. Their superior high temperature performance gives them an unexpected advantage over known polyurethanes, even those polyurethanes of Nalepa et al. which utilize mixtures of 3,5-di(methyl-thio)-2,4-diaminotoluene and 3,5-di(methylthio)-2,6-diaminotoluene as chain extenders.

The following examples are given to illustrate the invention and are not intended as a limitation thereof. In each of the examples, the reaction mixtures were prepared by mixing a chain extender with 130 g of a toluenediisocyanate prepolymer to provide 0.95 equivalent of the chain extender per equivalent of the prepolymer. The reaction mixtures were cast into molds at 100° C., demolded after about 30 minutes, and further postcured at 100° C. for 16 hours. The test pieces were aged for at least one week at 24° C. and 50% relative humidity prior to testing.

EXAMPLE I

Polyurethane I was prepared from a mixture of a commercial toluenediisocyanate/polytetramethylene glycol ether prepolymer having a nominal free —NCO content of 4.3% (Prepolymer A) and 3,5-di-(methylthio)-2,6-diaminotoluene (DM-2,6-TDA).

EXAMPLE II

Polyurethane II was prepared from a mixture of a commercial toluenediisocyanate/polytetramethylene glycol ether prepolymer having a nominal free —NCO content of 6.4% (Prepolymer B) and DM-2,6-TDA.

COMPARATIVE EXAMPLE A

Polyurethane A was prepared from a mixture of Prepolymer A and DMTDA-80/20, a product composed primarily of a mixture of 3,5-di(methylthio)-2,4-diaminotoluene and 3,5-di(methylthio)-2,6-diaminotoluene and obtained by reacting methyldisulfide with a commercial mixture composed of about 80% 2,4-diaminotoluene and 2,6-diaminotoluene in a manner similar to that described in Example 4 of Nalepa et al.

COMPARATIVE EXAMPLE B

Polyurethane B was prepared from a mixture of Prepolymer A and DMTDA-65/35, a product composed primarily of a mixture of 3,5-di(methylthio)-2,4- diaminotoluene and 3,5-di(methylthio)-2,6-diaminotoluene and obtained by reacting methyldisulfide with a commercial mixture composed of about 65% 2,4-diaminotoluene and 2,6-diaminotoluene in a manner similar to that described in Example 4 of Nalepa et al.

COMPARATIVE EXAMPLE C

Polyurethane C was prepared from a mixture of Prepolymer A and DM-2,4-DTA, a product composed primarily of 3,5-di(methylthio)-2,4-diaminotoluene and obtained by reacting methyldisulfide with 2,4-diaminotoluene in a manner similar to that described in Example 1 of Nalepa et al.

COMPARATIVE EXAMPLE D

Polyurethane D was prepared from a mixture of Prepolymer A and methylenebis(ortho-chloroaniline) (MOCA).

COMPARATIVE EXAMPLE E

Polyurethane E was prepared from a mixture of Prepolymer B and DMTDA-80/20.

COMPARATIVE EXAMPLE F

Polyurethane F was prepared from a mixture of Prepolymer B and DM-2,4-TDA.

Comparative properties of Polyurethanes I and A and of Polyurethanes II and E are shown in Table I.

TABLE I

| Polyurethane | I | A | II | E |
|---|---|---|---|---|
| Hardness A | 94 | 90 | 96 | 96 |
| Hardness D |  |  | 52 | 50 |
| Tensile | 4730 | 4400 | 7190 | 5670 |
| M-100 | 1700 | 1200 | 2640 | 1870 |
| M-300 | 2670 | 2160 | 4520 | 4170 |
| Elongation | 420 | 415 | 380 | 350 |
| Die C Tear | 540 | 365 | 570 | 420 |
| Tear Strength | 105 | 72 | 110 | 95 |
| Compression Set | 33 | 29 |  | 36 |
| Resilience | 57 | 48 | 54 | 48 |

As demonstrated by these comparisons, the polyurethanes of the present invention have better resilience than the known polyurethanes.

Polyurethane elastomers A, B, D, and I were tested for high temperature performance by (1) placing test samples in an oven at 25° C., (2) allowing the samples to equilibrate for 30 minutes, (3) removing the samples and testing and recording the Shore A hardness, (4) placing the samples back in the oven, (5) increasing the temperature by 25° C., (6) allowing the samples to equilibrate for 30 minutes, (7) removing them and testing them for Shore A hardness, and (8) continuing the cycle to a final temperature of 200° C. except for the samples that began to soften and lose their shape at 175° C. The Shore A hardness values determined for the samples after exposure at the test temperatures are shown in Table II.

TABLE II

| | SHORE A HARDNESS | | | |
|---|---|---|---|---|
| Temperature, °C. | A | B | D | I |
| 25 | 88 | 90 | 92 | 94 |
| 50 | 88 | 90 | 92 | 93 |
| 75 | 88 | 90 | 92 | 93 |
| 100 | 88 | 89 | 92 | 92 |
| 125 | 86 | 88 | 91 | 92 |
| 150 | 79 | 83 | 89 | 92 |
| 175 | 41 | 66 | 74 | 89 |

TABLE II-continued

| | SHORE A HARDNESS | | | |
|---|---|---|---|---|
| Temperature, °C. | A | B | D | I |
| 200 | — | — | — | 71 |

As demonstrated by this test, the polyurethane of the present invention have a high temperature performance which is much superior to that of the known polyurethanes. The novel polyurethanes retain at least 90% of their hardness at 175° C., lose less than 5% of their hardness between 150° C. and 175 C., and do not show any loss of hardness as great as 2% With any 25° C. increase in test temperature until the temperature exceeds 150° C., while the known polyurethanes retain less than 90% of their hardness at 175° C., lose more than 5% of their hardness between 150° C. and 175° C., and begin to show losses of hardness greater than 2% with 25 increases in test temperatures before the temperature exceeds 150° C. These advantages of the invention are also demonstrated in the test described below.

Polyurethane elastomers E, F, and II were tested for high temperature performance in a manner similar to that described above except that the aged samples, which consisted of two 0.071"-thick plies of polymer, were equilibrated in a circulating air oven for 45 minutes prior to being measured for Shore A hardness at the various test temperatures. The Shore A hardness values determined by the test are shown in Table III.

TABLE III

| | SHORE A HARDNESS | | |
|---|---|---|---|
| Temperature, °C. | E | F | II |
| 25 | 97 | 95 | 98 |
| 50 | 95 | 96 | 97 |
| 75 | 95 | 96 | 97 |
| 100 | 94 | 95 | 96 |
| 125 | 94 | 95 | 97 |
| 150 | 91 | 93 | 96 |
| 175 | 81 | 85 | 94 |
| 200 | 71 | 72 | 89 |
| 225 | 61 | 64 | 84 |

Polyurethane elastomers A, C, I, E, F, and II were subjected to dynamic mechanical thermal analysis (DMTA) at a frequency of 1 Hz and a heating rate of 4° C./minute with a single cantilever holder. The results of the analyses are shown in Table IV.

TABLE IV

| DMTA SOFTENING POINTS | |
|---|---|
| Polyurethane | Softening Point, °C. |
| A | 167 |
| C | 175 |
| I | 202 |
| E | 157 |
| F | 169 |
| II | 201 |

As shown by these data, the known polyurethanes have lower softening points than the polyurethanes of the present invention, the novel polyurethanes having softening points of at least 200° C.

It is obvious that many variations can be made in the products and processes set forth above without departing from the spirit and scope of this invention.

What is claimed is:

1. A polyurethane which loses less than 5% of its hardness between 150° C. and 175° C. and which has been prepared by a process which consists essentially of reacting 3,5-di(methylthio)-2,6-diaminotoluene containing not more than about 5% of impurities with a toluenediisocyanate prepolymer having a free —NCO content of 0.1-20% by weight.

2. The polyurethane of claim 1 wherein the prepolymer has a free —NCO content of 0.5-15% by weight.

3. The polyurethane of claim 2 wherein the prepolymer has a free —NCO content of 2-7% by weight.

4. The polyurethane of claim 1 wherein the toluenediisocyanate component of the prepolymer is toluene-2,4-diisocyanate.

5. The polyurethane of claim 1 wherein the toluenediisocyanate component of the prepolymer is toluene-2,6-diisocyanate.

6. The polyurethane of claim 1 wherein the toluenediisocyanate component of the prepolymer is a mixture of toluene-2,4-diisocyanate and toluene-2,6-diisocyanate.

7. The polyurethane of claim 1 wherein the prepolymer is a toluenediisocyanate/polyether polyol reaction product.

8. The polyurethane of claim 7 wherein the polyether polyol is a polytetramethylene ether glycol.

9. The polyurethane of claim 1 wherein the 3,5-di-(methylthio)-2,6-diaminotoluene is employed in an amount such as to provide 0.8-1.2 —$NH_2$ groups per free —NCO group.

10. The polyurethane of claim 9 wherein the —$NH_2$/—NCO ratio is 0.95-1.05.

11. The polyurethane of claim 1 which is prepared by reacting 0.8-1.2 equivalent proportions of 3,5-di(methylthio)-2,6-diaminotoluene with one equivalent proportion of a toluenediisocyanate prepolymer having a free —NCO content of 2-7% by weight and obtained by reacting a toluenediisocyanate component with a polytetramethylene ether glycol.

12. The polyurethane of claim 11 which is prepared by reacting 0.95-1.05 equivalent proportions of 3,5-di(methylthio)-2,6-diaminotoluene with one equivalent proportion of the prepolymer.

13. A process which comprises (A) casting into a mold a reaction mixture consisting essentially of 3,5-di(methylthio)-2,6-diaminotoluene containing not more than about 5% of impurities and a toluenediisocyanate prepolymer having a free —NCO content of 0.1-20% by weight, (B) curing the reaction mixture in the mold at a temperature of about 25-150° C. to form a polyurethane which loses less than 5% of its hardness between 150° C. and 175° C., and (C) removing the polyurethane from the mold.

14. The process of claim 13 wherein the reaction mixture comprises 0.8-1.2 equivalent proportions of 3,5-di(methyl-thio)-2,6-diaminotoluene and one equivalent proportion of a toluenediisocyanate prepolymer having a free —NCO content of 2-7% by weight and obtained by reacting a toluenediisocyanate component with a polytetramethylene ether glycol.

15. The process of claim 14 wherein the reaction mixture comprises 0.95-1.05 equivalent proportions of 3,5-di-(methylthio)-2,6-diaminotoluene and one equivalent proportion of the prepolymer.

16. The process of claim 13 wherein the mold is a tire mold.

17. A tire formed from a polyurethane which loses less than 5% of its hardness between 150° C. and 175° C. and which is prepared by a process which consists essentially of reacting 3,5-di(methylthio)-2,6-diaminotoluene containing not more than about 5% of impurities with a toluenediisocyanate prepolymer having a free —NCO content of 0.1-20% by weight.

18. The tire of claim 17 which is prepared by reacting 0.8-1.2 equivalent proportions of 3,5-di(methylthio)-2,6-diaminotoluene with one equivalent proportion of a toluenediisocyanate prepolymer having a free —NCO content of 2-7% by weight and obtained by reacting a toluenediisocyanate component with a polytetramethylene ether glycol.

19. The tire of claim 18 which is prepared by reacting 0.95-1.05 equivalent proportions of 3,5-di(methylthio)-2,6-diaminotoluene with one equivalent proportion of the prepolymer.

* * * * *